United States Patent
Hosking et al.

[11] Patent Number: 5,943,037
[45] Date of Patent: Aug. 24, 1999

[54] VIEWER ORIENTATION INDICATOR FOR AN ILLUSTRATION

[75] Inventors: John T. Hosking, San Jose, Calif.; Edward Cahill, Limtrick, Ireland

[73] Assignee: Snap-On Technologies, Inc., Lincolnshire, Ill.

[21] Appl. No.: 08/541,057

[22] Filed: Oct. 10, 1995

[51] Int. Cl.⁶ .................................................... G09G 5/36
[52] U.S. Cl. .......................... 345/139; 345/339; 345/348; 345/419
[58] Field of Search ..................................... 345/126, 121, 345/115, 139, 326, 334, 339, 342, 348, 349, 419, 427, 355; 359/326, 334, 339, 342, 348, 349, 355, 137, 119

[56] References Cited

U.S. PATENT DOCUMENTS

| | | |
|---|---|---|
| 4,685,070 | 8/1987 | Flinchbaugh ............................ 345/139 |
| 4,811,240 | 3/1989 | Ballow et al. . |
| 5,079,723 | 1/1992 | Herceg et al. . |
| 5,122,717 | 6/1992 | Hayashi . |
| 5,303,388 | 4/1994 | Kreitman et al. ........................ 395/159 |
| 5,347,628 | 9/1994 | Brewer et al. ........................... 395/159 |
| 5,424,938 | 6/1995 | Liddy et al. . |
| 5,430,839 | 7/1995 | Chhugani et al. . |
| 5,432,531 | 7/1995 | Beardall et al. . |
| 5,436,637 | 7/1995 | Gayraud et al. . |
| 5,437,009 | 7/1995 | Lane . |

*Primary Examiner*—Dennis-Doon Chow
*Attorney, Agent, or Firm*—Claude A. S. Hamrick

[57] ABSTRACT

A viewer orientation indicator that is presented as a set of symbols as perspective views of a three dimensional icon in association with an illustration, to provide the viewer with information regarding the viewpoint orientation of the illustration. A preferred embodiment of the viewpoint orientation indicator is a perspective view of an automobile image. Other viewpoint orientation indicator embodiments include an airplane, a computer, a truck, and a motor. The perspective view of the viewpoint orientation indicator is altered accordingly when the illustration has a changing viewpoint orientation, as with a motion picture illustration, a computer generated illustration or a holographic image.

36 Claims, 4 Drawing Sheets

5,943,037

VIEWER ORIENTATION INDICATOR FOR AN ILLUSTRATION

BACKGROUND OF THE INVENTION

1. Field of the Invention

The present invention relates generally to viewer orientation indicators, and more particularly to a set of symbols that are presented in perspective view, and which are used as viewer orientation indicators relative to an illustration.

2. Description of the Prior Art

It is often difficult for the viewer of an illustration, such as a technical drawing to understand the orientation, or viewpoint from which the illustration is drawn. A particular example of this problem is an illustration depicting detailed mechanical components of an automobile suspension system. The viewer of the illustration often finds it difficult to determine the viewpoint from which the illustration is made, and the viewpoint information is significant to the viewer's understanding and comprehension of the technical image. In an attempt to solve this problem, viewer orientation indicators have been utilized in association with such technical illustrations to provide the viewpoint orientation information of the illustration to the viewer.

FIG. 1 herein depicts a prior art image that has been utilized as a viewer orientation indicator for technical illustrations of automobile wheel components. As depicted in FIG. 1, the prior art indicator comprises a two dimensional depiction of an arrow having an arrow head and a shaft. The head of the arrow represents the front of the vehicle, such that the viewer of the indicator in association with a technical illustration can determine the viewpoint or orientation of the illustration relative to the vehicle orientation from the viewer's perspective. A capital letter F is placed in the head of the indicator to indicate the front of the vehicle. Significantly, it cannot be determined from the prior art indicator of FIG. 1 whether the viewpoint of the illustration is from the top side or the underside of the vehicle. Likewise, the prior art indicator cannot be utilized to provide information regarding other viewer orientations and viewpoints as related to such technical illustrations, such as from the right side, left side, or angular viewpoint orientation in three dimensional space.

SUMMARY OF THE INVENTION

The viewer orientation indicator of the present invention is a set of images of a three dimensional icon that are presented in perspective view to provide information regarding the viewpoint from which an illustration is made. A first embodiment of the indicator is a set of symbols comprising perspective views of an icon representing an automobile, where the illustration associated with it is a depiction of components of an automobile, specifically suspension related components. The viewer orientation indicator of the present invention may be presented as sets of perspective views of other icons representing devices such as an airplane, a truck, a computer, a motor or similar devices, where the illustration associated with the indicator is of components of such a device. The indicator may also be presented in a changing perspective view, where the illustration associated with the indicator is a moving motion picture, an alterable computer generated image or a holographic image.

It is an advantage of the present invention that an improved viewer orientation indicator is provided in a perspective view to aid in the comprehension of an illustration by a viewer.

It is another advantage of the present invention that the viewer of an illustration is provided with a viewer orientation indicator in perspective view to enhance the viewer's understanding of the viewpoint of the illustration.

It is a further advantage of the present invention that a viewer orientation indicator is provided for moving illustrations, such as are generated by motion pictures, computer generated images and holographic images.

These and other features and advantages of the present invention will become apparent from the following detailed description of the preferred embodiments and the accompanying drawings.

IN THE DRAWINGS

DETAILED DESCRIPTION OF THE PREFERRED EMBODIMENT

Figure 1:
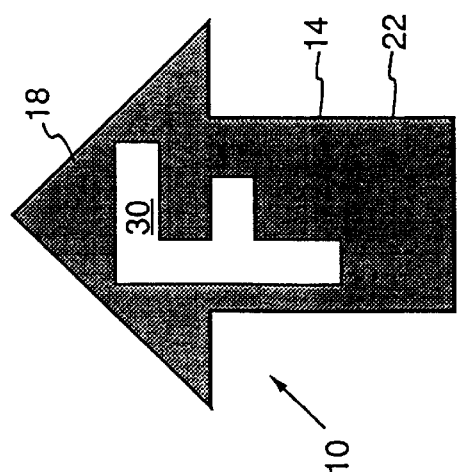
FIG. 1 depicts a prior art viewer orientation indicator for the orientation of an illustration related to a vehicle.

Viewer orientation indicators have been utilized in association with technical illustrations to provide the viewpoint orientation information of the illustration to the viewer. FIG. 1 herein depicts a prior art image 10 that has been utilized as a viewer orientation indicator for technical illustrations of automotive suspension components. As depicted in FIG. 1, the prior art indicator 10 comprises a two dimensional depiction of an arrow 14 having an arrow head 18 and a shaft 22. The head 18 of the arrow represents the front of the vehicle, such that the viewer of the indicator in association with a technical illustration can determine the viewpoint or orientation of the illustration relative to the vehicle orientation from the viewer's perspective. A capital letter F 30 may be placed in the head 18 of the indicator to further indicate the front of the vehicle.

The present invention comprises a set of viewer orientation indicator symbols comprising perspective views of a three dimensional icon developed to represent a device. One of the indicator symbols is utilized in combination with a technical illustration depicting a component of the device. In a first preferred embodiment, the device is an automobile and the icon is representative of an automobile. The technical illustrations shown in combination with the indicator are views of components of the automobile, such as suspension and steering components.

Figure 2:
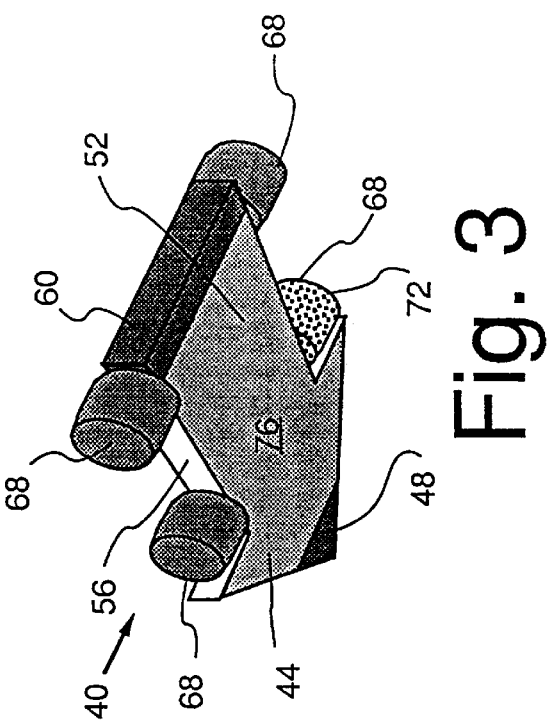
FIG. 2 is a viewer orientation indicator of the present invention in a perspective view.

As depicted in FIG. 2, one of the indicator symbols of the present invention 40 is a perspective view of a viewer orientation indicator icon representing an automobile vehicle for use in providing a viewer with viewpoint orientation information relative to a technical illustration of components of the automobile vehicle. The indicator symbol 40 has a front indicating means shown as an arrow head 44 in perspective view to indicate the front of the vehicle; a dark shaded tip 48 (preferably blue in a colored embodiment) further indicates the front of the vehicle. The indicator 40 has a shaft portion 52, shown in perspective with sides 56, one of which is visible in FIG. 2. The rearward end 60 of the shaft 52 is shown in perspective and it indicates the back of the vehicle. The end 60 is shaded darker than the shaft 52 for ease of viewing and is preferably red in a colored embodiment for ease of comprehension by the viewer. The top surface 64 of the indicator 40 is depicted in a light tone to indicate the top of the vehicle; it is preferably colored yellow in the preferred colored embodiment. The side 56 is shaded differently from the top surface 64 or rear surface 60 to aid in viewer comprehension; it is preferably light orange in a preferred colored embodiment. The four vehicle wheels 68 are shown in the three dimensional perspective depiction, two on each side of the shaft 52; they are darkly shaded, black in the preferred colored embodiment. In the preferred embodiment, one of the wheels 72 may be highlighted in a different shading (preferably green in the preferred colored embodiment) to draw attention to that wheel, where the technical illustration associated with the indicator 40 depicts suspension and steering components.

Figure 3:
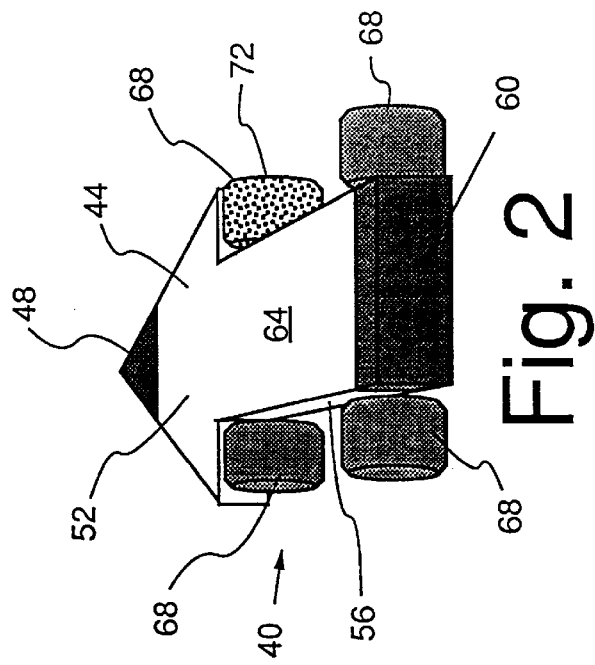
FIG. 3 is another perspective view of the viewer orientation indicator of FIG. 2.

FIG. 3 depicts the indicator symbol of FIG. 2 of the present invention in a different one of the set of perspective views from that of FIG. 2, specifically an underside perspective view. As depicted in FIG. 3, the head portion 44 depicts the front of the vehicle with a dark tip 48 as described above. The rear end 60 of the shaft 52 depicts the rear end of the vehicle. The surface 76 of the shaft 52 is provided with a darker shading than the top 64 to indicate the underside of the vehicle, and in the preferred colored embodiment the underside surface 76 is colored dark orange. Again, the wheels 68 are depicted in a dark shading (black in the preferred embodiment) and a specific wheel of interest 72 is highlighted in a different shading, which is green in the preferred, colored embodiment.

It is therefore to be understood that the indicator symbol views depicted in FIGS. 2 and 3 of the present invention provide information to a viewer regarding the orientation of a vehicle from the viewer's perspective. These indicator views of FIGS. 2 and 3 are utilized in association with particular further detailed illustrations regarding components of the highlighted component (the green colored wheel), to provide the viewer of such illustrations with specific information regarding the viewpoint orientation from which the detailed illustration was drawn. Thus, FIG. 2 is a vehicle depiction from the top rear end of the vehicle, whereas FIG. 3 is a view of the vehicle from the bottom rear end of the vehicle. Depending upon the viewpoint orientation which was utilized for the detailed illustration of components of the green wheel, either FIG. 2 or FIG. 3 (for example) would be presented in association with the technical illustration to advise the viewer of the technical illustration of the viewpoint direction from which the illustration was made. It is to be understood that the viewer orientation informational indicator 40 may be depicted in a plurality of different orientations and perspectives, that is a set of perspective views or symbols, and that the differing views of the indicator 40 representing differing viewpoint orientations from which other illustrations regarding detailed components of the vehicle are taken. All such differing perspective views constitute the set of views or symbols, and are within the scope and content of the present invention as are next discussed.

Figure 4:
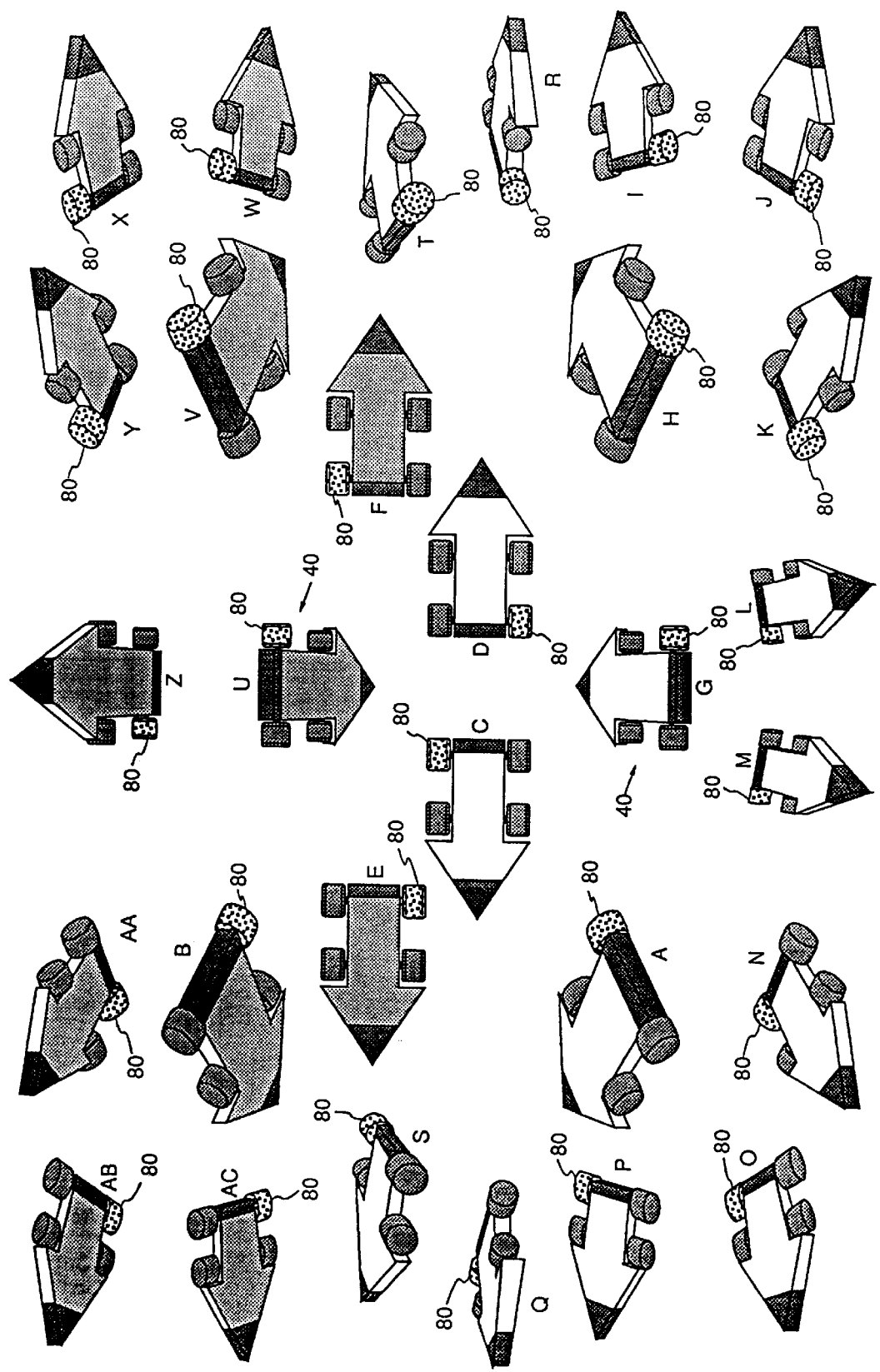
FIG. 4 depicts a plurality of perspective views of the viewer orientation indicator shown in FIGS. 2 and 3, for communicating different orientation information to a viewer of an illustration.

FIG. 4 depicts the viewer orientation indicator symbols of FIGS. 2 and 3 of the present invention 40 in a plurality of perspective views within the set of symbols. Each perspective view is an indicator symbol that represents a view of a vehicle from a different viewer location, and an appropriate one of the indicator views would be utilized in association with a detailed illustration of a vehicle component to give the viewer of the detailed illustration information regarding the viewpoint from which the detailed illustration was made. As depicted in FIG. 4, indicator symbol views A and B are substantially identical to the indicator views of FIGS. 2 and 3 respectively. Views C and D represent a top plan view of the vehicle, wherein the front of the vehicle is pointed to the left and to the right respectively. Views E and F represent bottom plan views of the vehicle, wherein the front of the vehicle is pointed to the left and the right respectively.

With regard to the various indicator symbol views depicted in FIG. 4, it can be seen that indicator views A and G–P are all top oriented perspective views of the viewer orientation indicator 40 differing in that a rear wheel 80 has been shaded other than black (green in the colored preferred embodiment) for emphasis rather than the right front wheel 72 of FIGS. 2 and 3. As depicted in FIG. 4 symbol views A and G–P are taken from an elevation of approximately 30° above the horizontal plane. View G may be thought of as 0° on the horizontal plane, view H as approximately 40°, view I as approximately 80°, view J as approximately 100°, view K as approximately 140°, view L as approximately 170°, view M as approximately 190°, view N as approximately 220°, view O as approximately 260°, view P as approximately 280°, and view A as approximately 320°. Views C and D are top plan views as described hereabove, views Q and R are side views with the front of the vehicle pointed relatively towards the viewer; and views S and T are relatively side views (having an elevation of approximately 10° above the horizontal plane) with the front of the vehicle pointing away from the viewer.

As depicted in FIG. 4, symbol views B and U-AD are taken from an elevation of approximately 30° below the horizontal. View U may be thought of as 0° on the horizontal plane, view V as approximately 40°, view W as approximately 80°, view X as approximately 100°, view Y as approximately 140°, view Z as approximately 180°, view AA as approximately 220°, view AB as approximately 260°, view AC as approximately 280°, and view B as approximately 320°.

It is to be understood that views A-AC are all views from a set of viewer orientation indicator symbols of the present invention, which views are depictions of a three dimensional icon that represents a device. The set of indicator symbols are used for orientating a viewer of an illustration. It is to be further understood that the set of views of the present invention includes other and further perspective views of the viewer orientation indicator icon, as there are an infinite number of such perspective views of the icon, all of which are within the scope of the invention.

Figure 5:
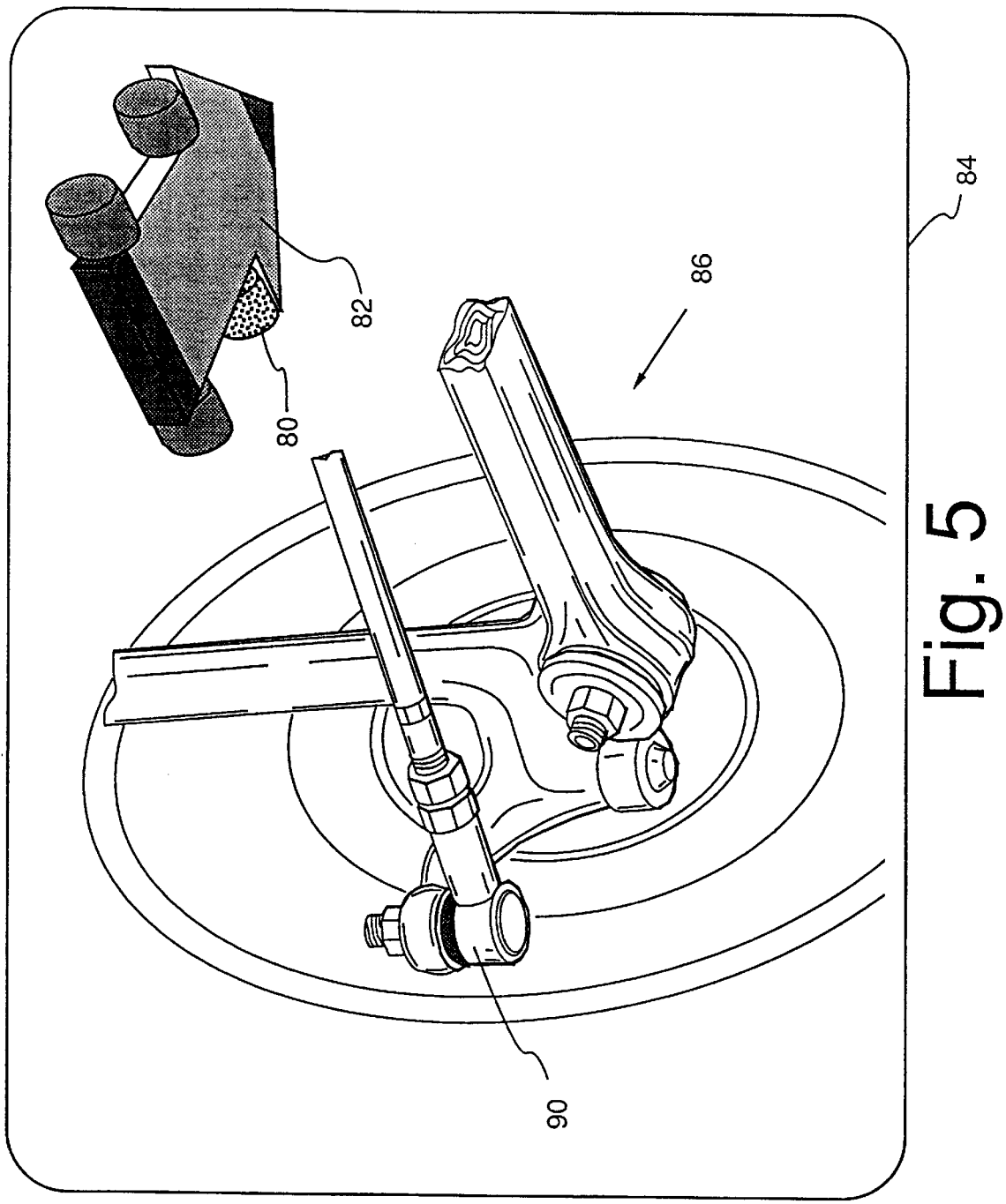
FIG. 5 depicts one of the indicators of FIG. 4 utilized in association with an illustration of automotive suspension components.

FIG. 5 depicts viewer orientation indictor symbol 82 comprising view V of FIG. 4 utilized in combination with an illustration 84 of an automobile wheel component 86. The suspension component 86 is shown by way of example only and it includes the interior components 90 of the wheel suspension linkage. When the illustration 84 is viewed by itself, it is not easy for the viewer to determine the orientation or viewpoint from which the illustration is made. This information is significant to a viewer in attempting to understand the suspension component features depicted in the illustration. When the viewer orientation indicator 82 is utilized in combination with the illustration 84, as shown in FIG. 5, the viewer of the illustration immediately knows the viewpoint from which the illustration was taken by looking at the indicator 82. While the viewpoint of the illustration could be described in words, the present invention provides a rapid visual indication to the viewer of the illustration, and the indicator provides a rapid, ready reminder of the viewpoint orientation of the illustration whenever the viewer looks at the illustration 84. It can thus be readily understood by those skilled in the art that the present invention provides valuable information to the viewer of the technical illustration.

Figure 6:
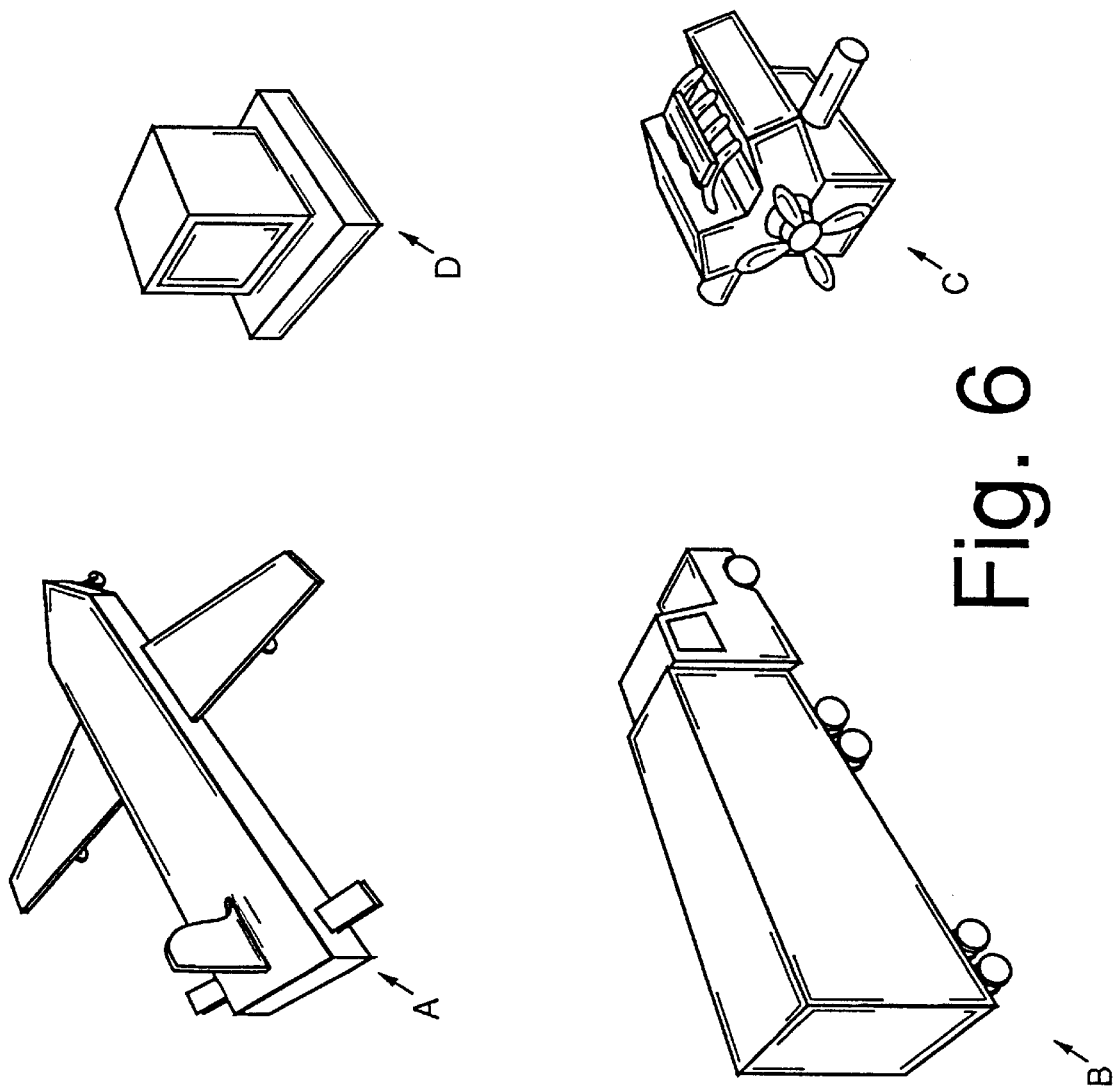
FIG. 6 depicts viewer orientation indicators related to devices other than a vehicle.

It will be obvious to those skilled in the art upon review of this specification that different viewer orientation indicator icons, such as icons representing devices such as airplanes, trains, trucks, motors, computers, and virtually all devices can be created and drawn in sets of symbols as specific perspective views, and utilized as orientation indicator symbols for illustrations depicting components of such devices. FIG. 6 depicts perspective views of such other viewer orientation indicator icons that are within the scope of the present invention. As depicted in FIG. 6, indicator A is a perspective view of an icon representing an airplane, indicator B is a perspective view of an icon representing a truck, indicator C is a perspective view of an icon representing an automobile motor, indicator D is a perspective view of an icon representing a computer. As has been described in detail above regarding the indicator 40 depicted in FIG. 2 and 3 and the further perspective depictions of that indicator in FIG. 4, each of the indicators in FIG. 6 may be depicted in a plurality of perspective views in order to comport with the viewer orientation of a technical illustration of components of the airplane, motor, truck or computer, to which the indicators of FIG. 6 apply. Thus, while the preferred embodiment 40 of the present invention is utilized in association with illustrations of components of automobiles or other four wheel vehicles (as is shown in FIGS. 2–5 and described herein), the invention is not so limited, and its application to other technical illustrations will become readily apparent from this detailed description.

The set of indicator symbols can be manufactured as a plurality of stickers, (such as those depicted in FIG. 4) where each indicator is removable from a backing and can be applied to a drawing constituting an illustration to indicate the viewpoint of the drawing.

The present invention is readily adaptable to motion picture illustrations, to computer generated illustrations which are movable or rotatable, and to holographic illustrations which change as the viewer's viewpoint is altered. In each case, the orientation of the viewpoint orientation indicator is changed as the viewpoint of the illustration changes. Thus, regarding a motion picture image, as the viewer's viewpoint of the picture illustration changes during the play of the motion picture, the orientation of the viewpoint indicator shown in combination with the illustration changes in like manner, such that the viewpoint orientation indicator is always in register with the viewpoint of the object in the motion picture illustration. Such a changing orientation of the viewpoint indicator is depicted in FIG. 4, wherein the changing viewpoint of the indicator 40 is depicted in the series of changing viewpoints A and G–P (for instance). Such a series of views of the vehicle orientation indicator 40 would be utilized where the changing viewpoint of the motion picture illustration rotated through 360° and was taken from an angle of approximately 30° above the horizontal plane.

Regarding a computer generated illustration, the set of views representing the indicator is stored as graphical images in the computer database. As the viewpoint orientation of a graphical illustration changes, the orientation of the viewpoint orientation indicator is also changed by the computer, and it is depicted in combination with the illustration on the computer screen, so as to be in register with the computer generated illustration. Such a changing orientation of the viewpoint indicator is depicted in FIG. 4, wherein the changing viewpoint of the indicator 40 is depicted in the series of changing viewpoints A and G–P (for instance). Such a series of views of the vehicle orientation indicator 40 would be utilized where the changing viewpoint of the computer generated illustration rotated through 360° and was taken from an angle of approximately 30° above the horizontal plane.

Regarding holographic images, the image of the viewpoint orientation indicator icon is also produced in holographic form in combination with the holographic illustration. Thus, when the orientation of the viewpoint of the holographic illustration changes, the orientation of the holographic viewpoint orientation indicator changes in register with it. Such a changing orientation of the viewpoint indicator is depicted in FIG. 4, wherein the changing viewpoint of the indicator 40 is depicted in the series of changing viewpoints A and G–P (for instance). Such a series of views of the vehicle orientation indicator 40 would be utilized where the changing viewpoint of an illustration rotated through 360° and was taken from an angle of approximately 30° above the horizontal plane. It is therefore to be understood that where a moving illustration is viewed, a viewpoint orientation indicator shown in combination with the illustration is likewise changed in its orientation; whereby a viewer is always provided with accurate visual information from the indicator regarding the viewpoint from which the illustration is taken.

While the invention has been shown and described with regard to certain preferred embodiments, it is to be understood that the present invention encompasses all those alterations and modifications as would be obvious to one of ordinary skill in the art upon reading this specification. Therefore, the following claims are intended to cover all those alterations and modifications to the preferred embodiments described hereinabove.

What I claim is:

1. A set of viewer orientation symbols for application to illustrations depicting a detailed view of a part of an object or system to indicate the location of the illustrated part on the object or system and the direction from which the view is taken, comprising:

a plurality of discrete symbols each evidencing a view taken from a different direction of a three-dimensional icon at least suggestively representative of the object or system partially depicted by the illustration, said icon having recognizable features identifying the six orthogonal views thereof including front, back, top, bottom, left and right sides, such that by associating one of said symbols with a particular illustration, the viewer can instantly deduce the viewing angle of the part illustrated.

2. A set of viewer orientation symbols as recited in claim 1 wherein said symbols further include indicia generally illustrating the location of the illustrated part on the object or system.

3. A set of viewer orientation symbols as recited in claim 1 wherein said icon includes a generally rectangular body having a top surface identified by a first indicia, a bottom surface indicated by a second indicia, left and right sides including image suggestive of vehicle wheels, a front surface evidenced by a third indicia, and a rear surface evidenced by a fourth indicia.

4. A set of viewer orientation symbols as recited in claim 1 wherein said symbols are embodied as graphical images contained within a computer database and are accessible for merger with a computer graphics image forming said illustration.

5. A set of viewer orientation symbols as recited in claim 1 wherein said symbols are embodied as stickers which can be applied to a drawing constituting said illustration.

6. A viewpoint orientation indicator comprising:

a set of three dimensional images of an object, each image of which is a view of the object from a different perspective; said indicator being used in association with an illustration to indicate viewpoint direction of the illustration, wherein said images in perspective view further include at least two of the following surfaces:

(a) one of either a top indicating surface or an underside indicating surface;

(b) one of either a left side indicating surface or a right side indicating surface; and (c) one of either a rear indicating surface or a front indicating surface.

7. A viewpoint orientation indicator as described in claim 6, further including a plurality of wheel indicating members being shown in perspective view with said image.

8. A viewpoint orientation indicator as described in claim 7 wherein one of said wheel indicating members is highlighted for visual emphasis.

9. A viewpoint orientation indicator as described in claim 8 wherein said object is representative of a four-wheeled vehicle.

10. A viewpoint orientation indicator as described in claim 6 wherein a portion of said image is highlighted for visual emphasis.

11. A viewpoint orientation indicator as described in claim 6 wherein said object is representative of one of the members of the group consisting of a computer, an airplane, a motor and a truck.

12. An illustration having a viewpoint orientation indicator associated in combination therewith, comprising:

an illustration;

a viewpoint orientation indicator shown in combination with said illustration, said viewpoint orientation indicator providing information regarding the viewpoint orientation of said illustration; said viewpoint orientation indicator including an image in perspective view of a three dimensional icon representative of an object of which said illustration depicts a component portion thereof.

13. An illustration having a viewpoint orientation indicator associated in combination therewith, as described in claim 12, wherein said image in perspective view further include at least two of the following surfaces:

(a) one of either a top indicating surface or an underside indicating surface;

(b) one of either a left side indicating surface or a right side indicating surface; and (c) one of either a rear indicating surface or a first indicating surface.

14. An illustration having a viewpoint orientation indicator associated in combination therewith, as described in claim 13, wherein said viewpoint orientation indicator further includes a plurality of wheel indicating members being shown in perspective view with said image.

15. An illustration having a viewpoint orientation indicator associated in combination therewith, as described in claim 14, wherein said one of said wheel indicating members is highlighted for visual emphasis.

16. An illustration having a viewpoint orientation indicator associated in combination therewith, as described in claim 15, wherein said icon is representative of an automobile.

17. An illustration having a viewpoint orientation indicator associated in combination therewith, as described in claim 13 wherein a portion of said image is highlighted for visual emphasis.

18. An illustration having a viewpoint orientation indicator associated in combination therewith, as described in claim 13, wherein said icon is representative of one of the members of the group consisting of a computer, an airplane, a motor, and a truck.

19. An illustration having a viewpoint orientation indicator associated in combination therewith as described in claim 13 wherein said illustration depicts a component of an automotive suspension, and said viewpoint orientation indicator icon represents a four-wheeled vehicle.

20. An illustration having a viewpoint orientation indicator associated in combination therewith as described in claim 13 wherein said illustration is presented to a viewer in an image that has an alterable viewpoint orientation and said viewpoint orientation indicator is presented to said viewer in an alterable perspective view in register with said viewpoint orientation of said illustration.

21. An illustration having a viewpoint orientation indicator associated in combination therewith as described in claim 20 wherein said illustration is presented as a motion picture image.

22. An illustration having a viewpoint orientation indicator associated in combination therewith as described in claim 20 wherein said illustration is presented in a computer generated image.

23. An illustration having a viewpoint orientation indicator associated in combination therewith as described in claim 20 wherein said illustration is presented as a holographic image.

24. A method for depicting the viewpoint orientation of an illustration comprising:

depicting an illustration of a device;

depicting a viewpoint orientation indicator in combination with said illustration to provide information regarding the viewpoint of said illustration, said viewpoint orientation indicator including an image in perspective view of a three dimensional icon representative of an object of which said device is a component portion thereof.

25. A method as described in claim 24 wherein said image in perspective view further includes at least two of the following surfaces:

(a) one of either a top indicating surface or an underside indicating surface;

(b) one of either a left side indicating surface or a right side indicating surface; and (c) one of either a rear indicating surface or a front side indicating surface.

26. A method as described in claim 25, further including a plurality of wheel indicating members being shown in perspective view with said image.

27. A method as described in claim 26 wherein one of said wheel indicating members is highlighted for visual emphasis.

28. A method as described in claim 27 wherein said icon is representative of a four-wheeled vehicle.

29. A method as described in claim 24 wherein said icon is representative of a member of the group consisting of a computer, an airplane, a motor and a truck.

30. A method as described in claim 24 wherein said illustration depicts a component of a suspension system, and said viewpoint orientation indicator icon represents a four-wheeled vehicle.

31. A method as described in claim 24 wherein said illustration is presented to a viewer in an image that has an alterable viewpoint orientation and said viewpoint orientation indicator is presented to said viewer in an alterable perspective view in register with said viewpoint orientation of said illustration.

32. A method of indicating view orientation of a pictorial illustration depicting a detailed view of a part of an object or system, comprising:

developing an icon having physical characteristics at least suggestively representative of the object or system partially depicted by the illustration;

generating a symbol in the form of an image of said icon as viewed from an angle corresponding to the illustrator's perspective of the part photographically or pictorially illustrated; and combining the symbol with the illustration to provide a viewer of the illustration with an immediate sense of viewing direction.

33. A method as recited in claim 32 wherein said symbol includes indicia evidencing the location of the illustration on the object or system.

34. A method as described in claim 33 wherein said illustration is presented as a motion picture image.

35. A method as described in claim 33 wherein said illustration is presented in a computer generated image.

36. A method as described in claim 33 wherein said illustration is presented as a holographic image.

\* \* \* \* \*